United States Patent [19]

Seo

[11] Patent Number: 5,469,322
[45] Date of Patent: Nov. 21, 1995

[54] CARBON BRUSH FOR DISCHARGING STATIC ELECTRICITY

[75] Inventor: Jung Y. Seo, Daegu-si, Rep. of Korea

[73] Assignee: Goldstar Electron Co., Ltd., Cheongju, Rep. of Korea

[21] Appl. No.: 993,348

[22] Filed: Dec. 18, 1992

[30] Foreign Application Priority Data

Dec. 20, 1991 [KR] Rep. of Korea ...................... 91-23620

[51] Int. Cl.$^6$ ....................................................... H05F 3/00
[52] U.S. Cl. .......................................... 361/220; 361/221
[58] Field of Search .................................... 361/212, 220, 361/221, 222

[56] References Cited

U.S. PATENT DOCUMENTS

| 3,636,408 | 1/1972 | Shuman | 361/221 |
| 3,757,164 | 9/1973 | Binkowski | 361/221 |
| 4,352,143 | 9/1982 | Uno | 361/221 |
| 4,494,166 | 1/1985 | Billings et al. | 361/221 |
| 4,771,360 | 9/1988 | Ayash | 361/221 |
| 5,010,441 | 4/1991 | Le Vantine | 361/221 |

FOREIGN PATENT DOCUMENTS 0205686  8/1988  Japan ...................... 361/222

*Primary Examiner*—Jeffrey A. Gaffin
*Attorney, Agent, or Firm*—Alan R. Loudermilk

[57] ABSTRACT

A carbon brush for discharging static electricity for protecting semiconductor devices from damage by the discharge of static electricity from the semiconductor devices. A plurality of carbon wires are attached to a brush securing bar in a suspending manner. Static electricity accumulated on semiconductor devices during various operations may be discharged through the brush securing bar to ground potential by coming into contact with the carbon wires.

18 Claims, 2 Drawing Sheets

CARBON BRUSH FOR DISCHARGING STATIC ELECTRICITY

FIELD OF THE INVENTION

The present invention relates to a carbon brush for discharging static electricity from semiconductor devices, and more particularly to a carbon brush that is capable of protecting semiconductor devices by discharging static electricity that the devices may have acquired during the implementation of various processes such as packaging, assembling or marking.

BACKGROUND OF THE INVENTION

With conventional semiconductor packaging, assembling or marking processes, static electricity may accumulate in or on a semiconductor device, which may be thereafter discharged during the moving, assembling, testing and marking of the semiconductor device. As a result, semiconductor devices frequently are damaged due to electrical discharge. So far, no adequate means has been provided that allows static electricity generated in or on the semiconductor device to be discharged during processing.

Undesired discharge of static electricity can cause an increase in the defect rate for the semiconductor devices and a deterioration in productivity. Further, the damage of semiconductor devices due to the discharge of static electricity during marking or assembling processes or the like has resulted in significant economic loss.

SUMMARY OF THE INVENTION

The present invention is intended to overcome the above described problems and disadvantages.

It is an object of the present invention to provide a carbon brush for discharging static electricity from a semiconductor device that is capable of protecting semiconductor devices by discharging static electricity that they may possess during the implementation of various processes such as packaging, assembling, marking and the like.

In achieving the above object, the carbon brush for discharging static electricity according to the present invention is made with a plurality of carbon wires having a certain length and a securing bar for fixedly securing one of the ends of the carbon wires, thereby forming a carbon brush.

The plurality of carbon wires are conductive and are connected to a grounded conductor in such a manner that the static electricity of a semiconductor device that contacts the carbon wires may be discharged from the semiconductor device through the carbon wires to ground potential.

The carbon brush according to the present invention may be used in such a manner that supporting plates are attached on the sides of the brush securing bar. The supporting plates may be installed on the left and right sides of the path of moving semiconductor devices like an over-bridge so as for the carbon wires to contact the tops of the moving semiconductor devices.

In an alternative embodiment, the carbon brush according to the present invention may be used in such a manner that the brush securing bar is provided in the form of a ring, and this ring shaped securing bar may be attached on the end face of a suction pad which holds a semiconductor device. With this embodiment, the carbon wires contact the top of the semiconductor device during operation of the suction pad, thereby discharging static electricity from the semiconductor device through the carbon brush.

The brush securing bar desirably is electrically conductive, and the carbon wires also are electrically conductive and properly elastic. Other materials having proper elasticity and electrical conductivity may be used instead of the carbon wires.

BRIEF DESCRIPTION OF THE DRAWINGS

The above object and other advantages of the present invention will become more apparent by describing in detail the preferred embodiments of the present invention with reference to the attached drawings in which.

DESCRIPTION OF THE PREFERRED EMBODIMENTS

Figure 1:
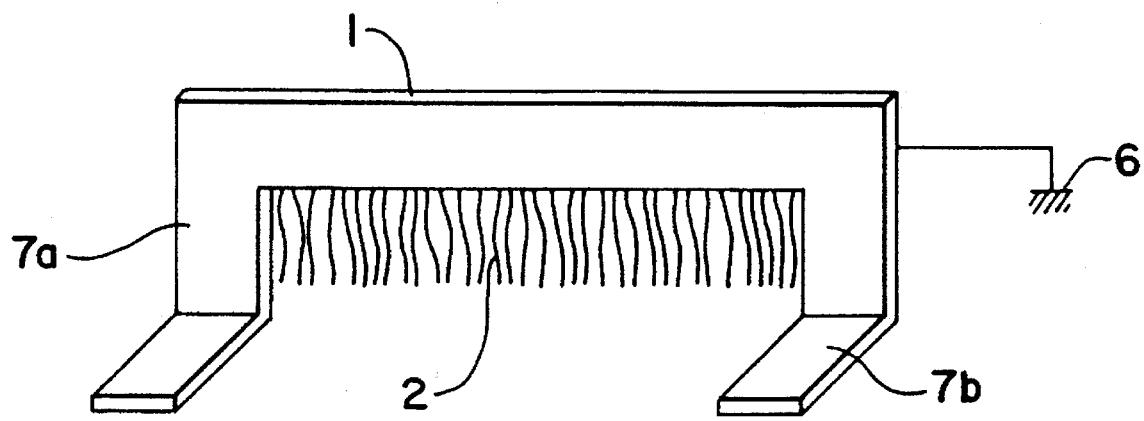
FIG. 1 is a perspective view showing an embodiment of the present invention.

FIG. 1 is perspective view showing an embodiment of the carbon brush according to the present invention.

FIG. 1 illustrates a carbon brush for discharging static electricity for protecting semiconductor devices from damage by the discharge of static electricity from the semiconductor devices through carbon wires. As shown in FIG. 1, a plurality of carbon wires 2 are attached to brush securing bar 1 in a suspending manner. The brush securing bar is electrically connected to ground potential 6. Static electricity that may have accumulated on a semiconductor device may be discharged through carbon wires 2 and brush securing bar 1 to ground potential 6.

The plurality of carbon wires 2 are secured to brush securing bar 1 in an aligned form much like a brush. Further, a pair of supporting plates 7a and 7b are attached to the opposite ends of brush securing bar 1, and, as illustrated in FIG. 1, supporting plates 7a and 7b also may have horizontally-extending portions to serve as a base.

Figure 2:
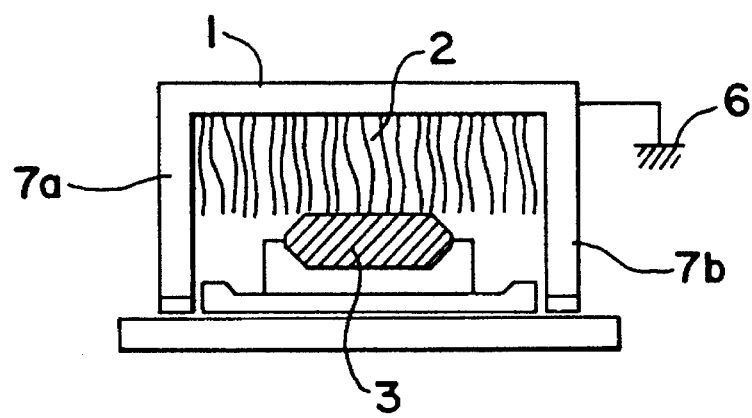
FIG. 2 illustrates an application of a carbon brush in accordance with the present invention in which a semiconductor device passes beneath the carbon brush.

FIG. 2 is a front view of a carbon brush installed like a bridge over a path along which semiconductor device 3 moves. The carbon brush structure of this embodiment is installed in such a manner that supporting bars 7a and 7b are secured on the left and right sides of the (or passway) of semiconductor device 3, and that carbon wires 2 are long enough to contact the tops of the moving semiconductor devices passing below on the moving pass way (or pathway), such as is illustrated by semiconductor device 3 in FIG. 2. Carbon wires 2 are electrically connected to ground potential through brush securing bar 1.

Brush securing bar 1 may be a conductor. If brush securing bar 1 is non-conductive, carbon wires 2 may be connected to a conductor so that carbon wires 2 discharge static electricity from the contact portions of the semiconductor devices to ground potential 6 through the conductor.

When semiconductor devices pass under carbon wires 2, carbon wires 2 that are suspended from brush securing bar 1 contact the tops of the moving semiconductor devices, and as a result static electricity accumulated on the semiconductor devices is discharged to ground potential 6, thereby making it possible to carry (move) the semiconductor devices safely without electric charges. The carbon wires are weak in elasticity and, therefore, the carbon wires neither impede the movement of the semiconductor devices nor produce scratches on the semiconductor devices.

Figure 3:
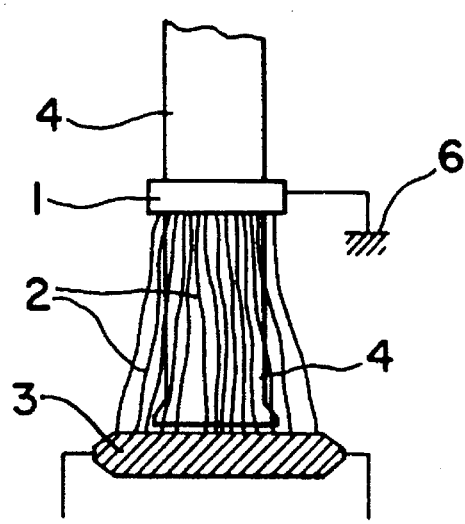
FIG. 3 illustrates another application of the present in which the carbon brush is on a suction head.
Figure 4:
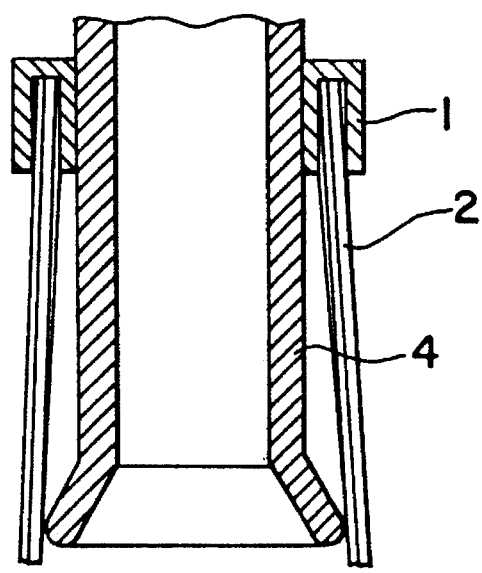
FIG. 4 further illustrates the brush securing bar attached to the suction head in the embodiment of FIG. 3.

FIG. 3 illustrates an embodiment of the present invention in which the carbon brush is installed to suction pad 4 holding semiconductor device 3. As illustrated in FIG. 3, brush securing bar 1 is ring-shaped and attached to the end portion of suction pad 4 in such a manner that carbon wires 2 may contact the top of semiconductor device 3 which is attached to suction pad 4. FIG. 4 illustrates ring-shaped brush securing bar 1 attached to the end portion of suction pad 4, with carbon wires 2 extending beyond the end of suction pad 4. Static electricity that may have accumulated during the operation of the suction pad is discharged to ground potential 6 through the carbon brush attached to the end portion of suction pad 4.

According to the embodiments of the present invention as described above, the carbon brush may be installed as shown in FIGS. 2 or 3, with the result that static electricity accumulated on the semiconductor devices during various operations are discharged through the carbon brush to ground, thereby protecting the semiconductor devices.

Although various preferred embodiments of the present invention have been disclosed for illustrative purposes, those skilled in the art will appreciate that various modifications, additions and/or substitutions are possible without departing for the scope and spirit of the present invention as disclosed in the claims.

What is claimed is:

1. A brush for discharging static electricity from a semiconductor device on a moving pathway, comprising:

a plurality of electrically conductive wires electrically connected to ground potential; and a brush securing bar for securing the wires in a substantially aligned manner over the moving pathway;

wherein static electricity accumulated on the semiconductor device is discharged through the wires to ground potential as the semiconductor device moves along the moving pathway.

2. The brush for discharging static electricity as claimed in claim 1, wherein a pair of supporting plates are attached at both ends of the brush securing bar, wherein the supporting plates are positioned along both sides of the moving pathway, wherein the wires contact the semiconductor device as it moves along the moving pathway.

3. The brush for discharging static electricity as claimed in claim 2, wherein the brush securing bar is electrically conductive.

4. The apparatus of claim 3, wherein the wires comprise carbon wires.

5. The apparatus of claim 2, wherein the wires comprise carbon wires.

6. The brush for discharging static electricity as claimed in claim 1, wherein the brush securing bar is electrically conductive.

7. The apparatus of claim 6, wherein the wires comprise carbon wires.

8. The apparatus of claim 1, wherein the wires comprise carbon wires.

9. An apparatus for discharging static electricity from a semiconductor device held by a suction head, comprising:

a plurality of electrically conductive wires electrically connected to ground potential; and a brush securing bar extending around the suction head, wherein the brush securing bar secures the wires in a manner that the wires contact the semiconductor device held by the suction head;

wherein static electricity accumulated on the semiconductor device is discharged through the wires to ground potential.

10. The apparatus of claim 9, where the brush securing bar is electrically conductive.

11. The apparatus of claim 10, wherein the wires comprise carbon wires.

12. The apparatus of claim 9, wherein the wires comprise carbon wires.

13. A method for discharging static electricity from a semiconductor device during processing of the semiconductor device, comprising the steps of:

moving the semiconductor device along a moving pathway;

securing a plurality of wires electrically connected to ground potential, wherein the plurality of wires are secured in a position to come into contact with the semiconductor device;

contacting the semiconductor device with the plurality of wires; and discharging the static electricity to ground potential through the plurality of wires.

14. The method of claim 13, wherein the plurality of wires are secured above the moving pathway, wherein the semiconductor device contacts the plurality of wires as the semiconductor device moves along the moving pathway.

15. The method of claim 14, wherein the wires comprise carbon wires.

16. The method of claim 13, further comprising the step of holding the semiconductor device with a suction head, wherein the semiconductor device contacts the plurality of wires as the semiconductor device is held by the suction head.

17. The method of claim 16, wherein the wires comprise carbon wires.

18. The method of claim 13, wherein the wires comprise carbon wires.

\* \* \* \* \*